(12) United States Patent
Kim

(10) Patent No.: US 10,185,367 B2
(45) Date of Patent: Jan. 22, 2019

(54) DISPLAY DEVICE

(71) Applicant: SAMSUNG DISPLAY CO., LTD., Yongin-si, Gyeonggi-Do (KR)

(72) Inventor: Youn Joon Kim, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/869,627

(22) Filed: Jan. 12, 2018

(65) Prior Publication Data

US 2018/0341293 A1    Nov. 29, 2018

(30) Foreign Application Priority Data

May 29, 2017   (KR) .......................... 10-2017-0066264

(51) Int. Cl.
*G06F 1/16* (2006.01)
*G09F 9/30* (2006.01)

(52) U.S. Cl.
CPC .......... *G06F 1/1675* (2013.01); *G06F 1/1616* (2013.01); *G06F 1/1652* (2013.01); *G09F 9/301* (2013.01)

(58) Field of Classification Search
CPC combination set(s) only.
See application file for complete search history.

(56) References Cited

U.S. PATENT DOCUMENTS

| 7,559,163 | B2 * | 7/2009 | Ofuji ...................... G03B 21/58 160/265 |
| 9,348,362 | B2 * | 5/2016 | Ko .......................... G06F 1/1626 |
| 9,772,657 | B2 * | 9/2017 | Takayanagi ........... G06F 1/1615 |
| 9,864,412 | B2 * | 1/2018 | Park ....................... G06F 1/1656 |
| 9,911,369 | B2 * | 3/2018 | Kim ........................ G09F 9/301 |
| 2016/0374228 | A1 * | 12/2016 | Park ........................ G09F 9/301 |
| 2017/0208157 | A1 * | 7/2017 | Kim ....................... G06F 1/1652 |

FOREIGN PATENT DOCUMENTS

| KR | 10-2014-001466 | 2/2014 |
| KR | 10-2016-0024151 | 3/2016 |
| KR | 10-1714902 | 3/2017 |

\* cited by examiner

*Primary Examiner* — Lisa Lea Edmonds
(74) *Attorney, Agent, or Firm* — F. Chau & Associates, LLC

(57) ABSTRACT

A display device, includes a display panel including a first region, a bendable region, and a second region arranged in sequence. The display device further includes a panel support unit including a first support plate for supporting the first region, a form varying support unit for supporting the bendable region, and a second support plate for supporting the second region. The display device additionally includes an elastic support unit including a first guide line provided on a lateral side of the first support plate, a second guide line provided on a lateral side of the second support plate, a first rolling member rotatably coupled to the first guide line, a second rolling member rotabably coupled to the second guide line, and an elastic body including a first end portion fixed to the first rolling member and a second end portion fixed to the second rolling member.

20 Claims, 12 Drawing Sheets

DISPLAY DEVICE

CROSS-REFERENCE TO RELATED APPLICATION

This application claims priority under 35 U.S.C. § 119 to Korean Patent Application No. 10-2017-0066264 filed in the Korean Intellectual Property Office on May 29, 2017, the disclosure of which is incorporated by reference herein in its entirety.

TECHNICAL FIELD

One or more exemplary embodiments of the present invention relates to a display device, and more particularly, to a foldable display device.

DISCUSSION OF THE RELATED ART

A flexible display panel is a display panel in which a plurality of pixels is disposed on a flexible substrate such as a plastic film. Foldable display devices may include a flexible display panel and a foldable module that can be folded and unfolded.

However, when the flexible display panel uses a thin glass sheet as a cover window, but it may not be freely folded due to high bending stiffness, for example.

SUMMARY

According to an exemplary embodiment of the present invention, a display device, includes a display panel including a first region, a bendable region, and a second region arranged in sequence. The display device further includes a panel support unit including a first support plate for supporting the first region, a form varying support unit for supporting the bendable region, and a second support plate for supporting the second region. The display device additionally includes an elastic support unit including a first guide line provided on a lateral side of the first support plate, a second guide line provided on a lateral side of the second support plate, a first rolling member rotatably coupled to the first guide line, a second rolling member rotabably coupled to the second guide line, and an elastic body including a first end portion fixed to the first rolling member and a second end portion fixed to the second rolling member.

According to an exemplary embodiment of the present invention, the display device includes a display panel including a first region, a bendable region, and a second region consecutively arranged in a first direction. The display device further includes a panel support unit including a first support plate corresponding to the first region, a form varying support unit corresponding to the bendable region, and a second support plate corresponding to the second region. The panel support unit is configured to switch between an unfolded state and a folded state by a movement of the bendable region and the form varying support unit. The display device additionally includes an elastic body including a first end portion connected with a first rolling member configured to slide and rotate in the first direction on a lateral side of the first support plate and a second end portion connected with a second rolling member configured to slide and rotate in the first direction on a lateral side of the second support plate. The elastic body is connected to the first support plate and the second support plate. The elastic body extends to a first length in the unfolded state, and when switching to the folded state from the unfolded state, the first support plate and the second support plate are pulled toward each other by contraction of the elastic body.

According to an exemplary embodiment of the present invention, the display device includes a flexible display panel including a first region, a second region and a flexible region disposed between the first region and the second region. The display device further includes a panel support structure including a first support plate overlapping the first region, a form varying support unit overlapping the flexible region and including a plurality of joints, and a second support plate overlapping the second region. The display device additionally includes an elastic support unit including a first guide line, a second guide line, a first rolling member and a second rolling member respectively disposed in the first guide line and in the second guide line, and an elastic body connected to the first and second rolling members. The first guide line is provided in a lateral side of the first support plate and the second guide line is provided in a lateral side of the second support plate, and the first and second rolling members respectively travel inside of the first and second guide lines.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION OF THE EMBODIMENTS

Figure 1:
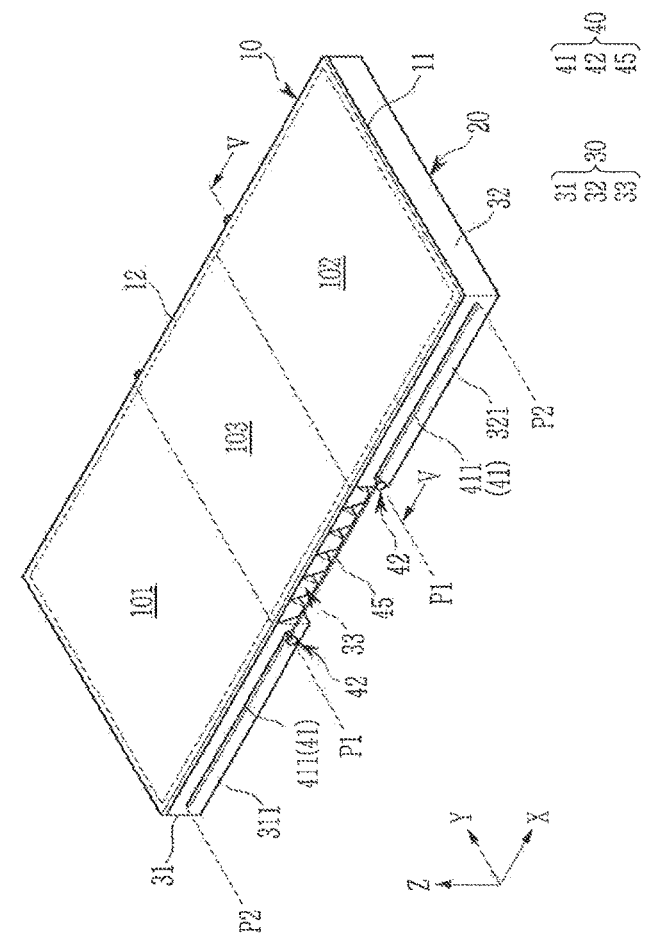
FIG. 1 shows a perspective view of an unfolded state of a display device according to an exemplary embodiment of the present invention.

Exemplary embodiments of the present invention will be described more fully hereinafter with reference to the accompanying drawings. It will be understood, however, that the described embodiments of the present invention may be modified in various different ways.

Like reference numerals may designate like elements throughout the present disclosure.

It will be understood that the size and thickness of each configuration shown in the drawings may be exaggerated for better understanding and ease of description, but the present invention is not limited thereto.

It will be understood that when an element such as a layer, film, region, or substrate is referred to as being "on" another element, it may be directly on the other element or intervening elements may also be present.

Figure 2:
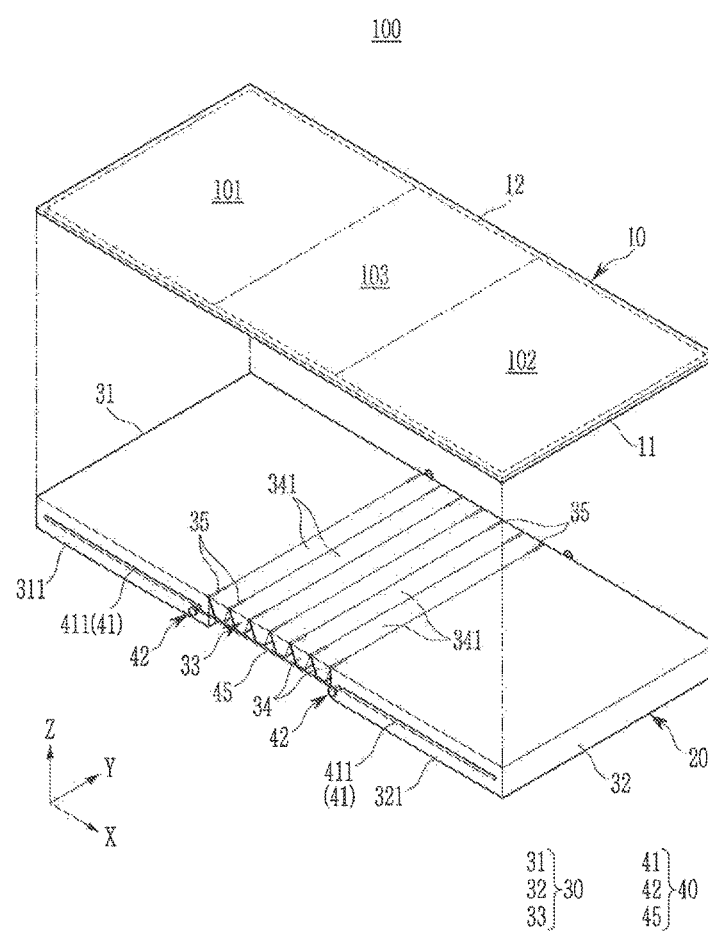
FIG. 2 shows an exploded perspective view of a display device shown in FIG. 1 according to an exemplary embodiment of the present invention.
Figure 3:
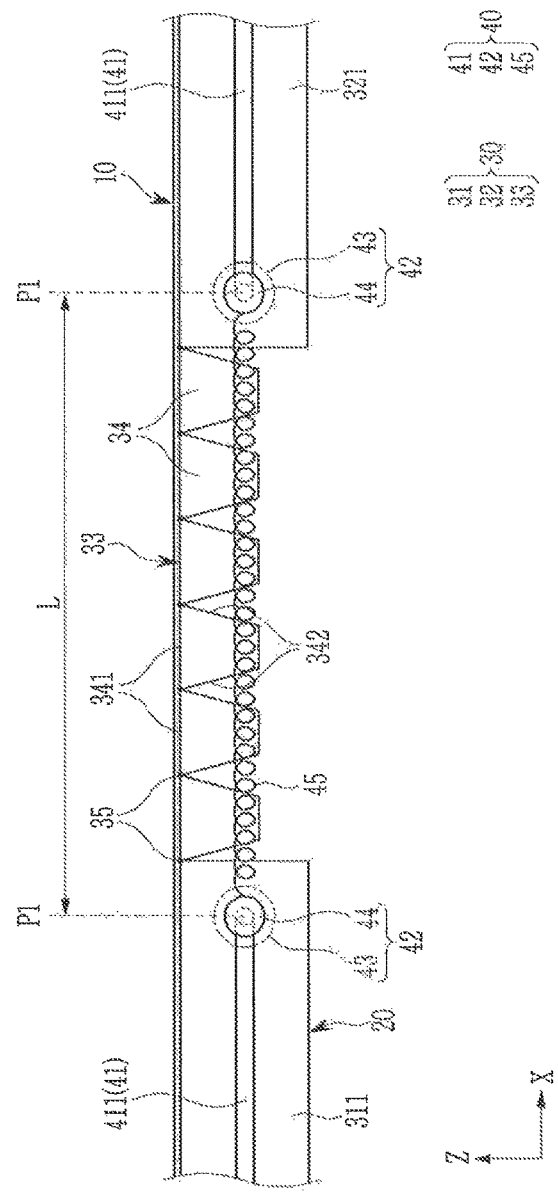
FIG. 3 shows a partial side view of a display device shown in FIG. 1 according to an exemplary embodiment of the present invention.
Figure 4:
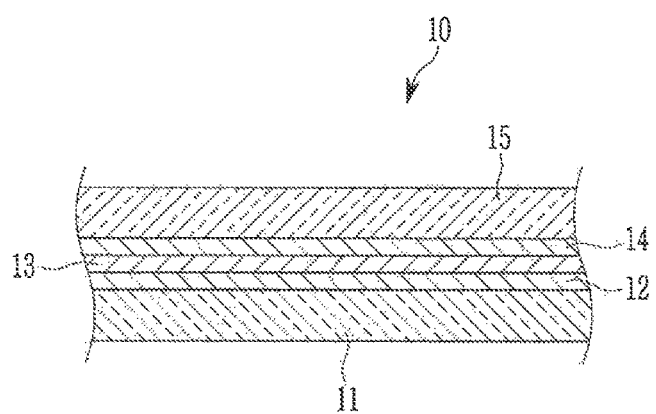
FIG. 4 shows a cross-sectional view of a display panel in a display device shown in FIG. 3 according to an exemplary embodiment of the present invention.

FIG. 1 shows a perspective view of an unfolded state of a display device according to an exemplary embodiment of the present invention, and FIG. 2 shows an exploded perspective view of a display device shown in FIG. 1 according to an exemplary embodiment of the present invention. FIG. 3 shows a partial side view of a display device shown in FIG. 1 according to an exemplary embodiment of the present invention, and FIG. 4 shows a cross-sectional view of a display panel in a display device shown in FIG. 3 according to an exemplary embodiment of the present invention.

Referring to FIG. 1 to FIG. 4, the display device 100 according to an exemplary embodiment of the present invention includes a display panel 10 and a foldable module 20. The foldable module 20 supports the display panel 10 and is configured to be switchable to an unfolded state and a folded state.

The display panel 10 includes a flexible substrate 11 and a display unit 12 provided on the flexible substrate 11. The flexible substrate 11 may include a plastic film, and the display unit 12 may include a plurality of pixels and driving circuits. The display panel 10 may further include a touch sensor 13, an external light reflection reducer 14, and a cover window 15.

The cover window 15 is provided on a highest portion of the display panel 10 to protect the display unit 12 from external impacts and scratches. For example, the cover window 15 may form the top surface of the display panel 10. The cover window 15 may be made of a glass sheet that is thin enough to be bent (e.g., about 50 μm to about 100 μm thick).

The display panel 10 including the cover window 15 made of a glass sheet may have excellent screen quality. The display panel 10 may not be freely bent because of the bending stiffness of the glass sheet composing the cover window 15. The bending stiffness of the cover window 15 is proportional to the thickness of the cover window 15, and thus, a stress capable of being generated at the cover window 15 linearly increases as the thickness of the cover window 15 increases.

The display panel 10 includes a first region 101, a bendable region 103, and a second region 102 consecutively arranged in a first direction (e.g., an X direction). The first region 101 and the second region 102 may be flat regions, and may have a same length or different lengths in the first direction (e.g., the X direction). The bendable region 103 is flat when the display device 100 is in the unfolded state, and it is bent when the display device 100 is in the folded state The display panel 10 may be an organic light emitting diode display panel, a liquid crystal display panel, or an electrophoretic display panel. However, the present invention it is not limited thereto.

The foldable module 20 includes a panel support unit 30 and an elastic support unit 40. The panel support unit 30 is combined with the display panel 10 to support the display panel 10, and the elastic support unit 40 is combined with the panel support unit 30 to reduce the bending stiffness of the display panel 10.

The panel support unit 30 includes a first support plate 31 corresponding to the first region 101, a second support plate 32 corresponding to the second region 102, and a form varying support unit 33 corresponding to the bendable region 103. A rear side of the first region 101 may be attached to the first support plate 31, and a rear side of the second region 102 may be attached to the second support plate 32. The first support plate 31 and the second support plate 32 may face each other with the form varying support unit 33 therebetween. The first support plate 31 and the second support plate 32 respectively include a pair of lateral sides in parallel to the first direction (e.g., an X direction). For example, the first support plate 31 may have a pair of sides 311, and the second support plate 32 may have a pair of sides 321.

The form varying support unit 33 may include a multi-joint member. For example, the multi-joint member may include a plurality of joints 34 consecutively arranged in the first direction (e.g., the X direction). The joints 34 may have, for example, a bar shape extending in a second direction (e.g., a Y direction) crossing the first direction (e.g., the X direction), and the joints 34 may have a trapezoidal shape in a cross-sectional view in the first direction (e.g., the X direction).

The joints 34 may respectively include a support side 341 facing the bendable region 103, and two slanted sides 342 provided at a back of the support side 341. For example, the two slanted sides 342 may extend from the support side 341. The joints 34 may respectively rotate with respect to two rotation shafts 35 provided on respective end portions of the support side 341, and each joint 34 may be combined with a neighboring joint 34 with the rotation shaft 35 therebetween.

For example, the first support plate 31, the joints 34, and the second support plate 32 may be connected by a plurality of hinge shafts. In this case, the hinge shafts function as the rotation shafts 35. A plurality of support sides 341 are parallel to each other in the unfolded state of the display device 100, and are parallel to the first support plate 31 and the second support plate 32.

The multi-joint member may also be an elastic plate with a plurality of triangular shaped grooves arranged at the back of the elastic plate and parallel to the second direction (e.g., the Y direction). In this case, an upper portion of each triangular shaped groove is bent and functions as the rotation shaft 35.

The form varying support unit 33 is not limited to the multi-joint member, and a configuration that is switchable between the flat state and the bent state is applicable thereto. The display device 100 is in the unfolded state when the form varying support unit 33 is flat, and the display device 100 is in the folded state when the form varying support unit 33 is bent.

A rear side (e.g., bottom surface) of the bendable region 103 may or may not be attached to the form varying support unit 33. In this case, the rear side of the bendable region 103 may contact the support side 341 of the form varying support unit 33 or may remain slightly separated from the support side 341. This may reduce the stress applied to the bendable region 103 while the display device 100 is in the folded state.

Figure 5:
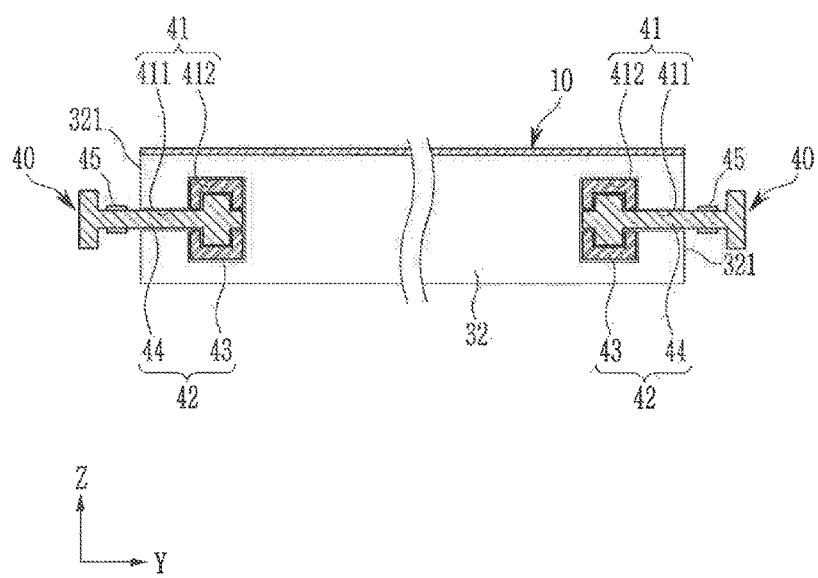
FIG. 5 shows a cross-sectional view of a display device with respect to a line V-V of FIG. 1 according to an exemplary embodiment of the present invention.
Figure 6:
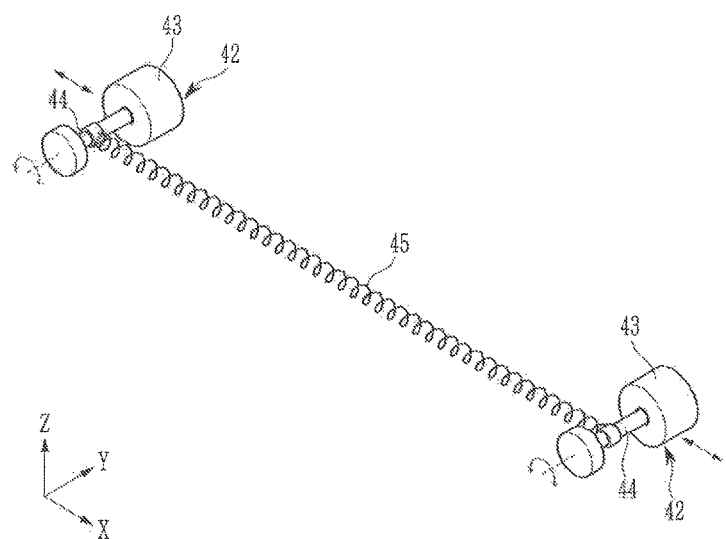
FIG. 6 shows a partial perspective view of an elastic support unit in a display device shown in FIG. 1 according to an exemplary embodiment of the present invention.

FIG. 5 shows a cross-sectional view of a display device with respect to a line V-V of FIG. 1 according to an exemplary embodiment of the present invention, and FIG. 6 shows a partial perspective view of an elastic support unit in a display device shown in FIG. 1 according to an exemplary embodiment of the present invention.

Referring to FIG. 1, FIG. 5, and FIG. 6, the elastic support unit 40 includes a pair of guide lines 41 (e.g., openings in the first and second support plates 31 and 32) provided on at least one lateral side 311 of the first support plate 31 and at least one lateral side 321 of the second support plate 32, a pair of rolling members 42 disposed in the one pair of guide lines 41 such that the rolling members 42 may slide or rotate along the guide lines 41, and an elastic body 45 having respective end portions fixed to the one pair of rolling members 42.

The first support plate 31 includes two lateral sides 311 in parallel to the first direction (e.g., the X direction), and the second support plate 32 includes two lateral sides 321 in parallel to the first direction (e.g., the X direction). A pair of guide lines 41 are provided on one lateral side 311 of the first support plate 31 and one lateral side 321 of the second support plate 32 facing each other in the first direction (e.g., the X direction) with the form varying support unit 33 therebetween.

The one pair of guide lines 41 linearly extend in the first direction (e.g., the X direction), and include a first end portion P1 provided to be closest to the form varying support unit 33 and a second end portion P2 provided to be the most distant from the form varying support unit 33. The one pair of guide lines 41 may include an inlet portion 411 and an internal portion 412 that is wider than the inlet portion 411. In other words, the one pair of guide lines 41 may be a concave groove and have a T-like shape in the cross-sectional view. One pair of rolling members 42 may include a ring-shaped slider 43 received in the internal portion 412 of the guide line 41, and a rotation pin 44 including a first end combined to the slider 43 such that the rotation pin 44 can rotate and a second end protruding outside of the guide line 41. In an exemplary embodiment of the present invention, the slider 43 and the rotation pin 44 may have circular shapes, and the rotation pin 44 may have a diameter smaller than that of the slider 43. The slider 43 may be inserted into the internal portion 412 of the guide line 41 with a sliding margin and may slide in a length direction of the guide line 41 (e.g., the X direction).

The slider 43 functions as a bearing for supporting rotation of the rotation pin 44, and it may be combined with the rotation pin 44 in various ways. For example, the rotation pin 44 and the slider 43 may be combined by a protrusion-groove structure to prevent the rotation pin 44 from detaching from the slider 43, and may be combined by loosely inserting the rotation pin 44 into the slider 43 so that the rotation pin 44 may rotate in the slider 43. The combined structure of the rotation pin 44 and the slider 43 is not limited to the shown example.

The elastic body 45 may include various elastic members such as an elastic band or a coil spring, and respective end portions of the elastic body 45 are fixed to a pair of rotation pins 44. For illustrative purposes, FIG. 1 and FIG. 6 show the elastic body 45 including a coil spring. However, the present invention is not limited thereto.

The foldable module 20 may include an elastic support unit 40 connected to one side of the panel support unit 30, or may include a pair of elastic support units 40 connected to respective sides of the panel support unit 30. FIG. 5 illustrates the case in which the foldable module 20 includes a pair of elastic support units 40. However, the present invention is not limited thereto.

A length (L) (refer to FIG. 3) between two first end portions P1 provided on respective sides of the form varying support unit 33 is greater than an initial length (e.g., the length of the elastic body 45 when no tensile force is applied) of the elastic body 45. While the display device 100 is in the unfolded state, a pair of rolling members 42 are provided on the first end portion P1 that is provided nearest to the form varying support unit 33, and the elastic body 45 can extend to the maximum extent. The extended elastic body 45 has an elastic restoration force to contract back to its initial side, for example.

The display device 100 according to an exemplary embodiment of the present invention may be folded by an out-folding method in which the display panel 10 is provided outside the foldable module 20 in the folded state, and an in-folding method in which the display panel 10 is provided inside the foldable module 20 in the folded state. For example, by using the out-folding method, the first region 101 of the display panel 10 may face away from the second region 102 of the display panel 10, and by using the in-folding method, the first region 101 may face the second region 102.

In other words, the display device 100 may have a uni-directional folding structure such that it can be folded by the out-folding method and the in-folding method, or it may have a bi-directional folding structure such that a user may bend the display device 100 by selecting one of the out-folding method and the in-folding method.

Figure 7:
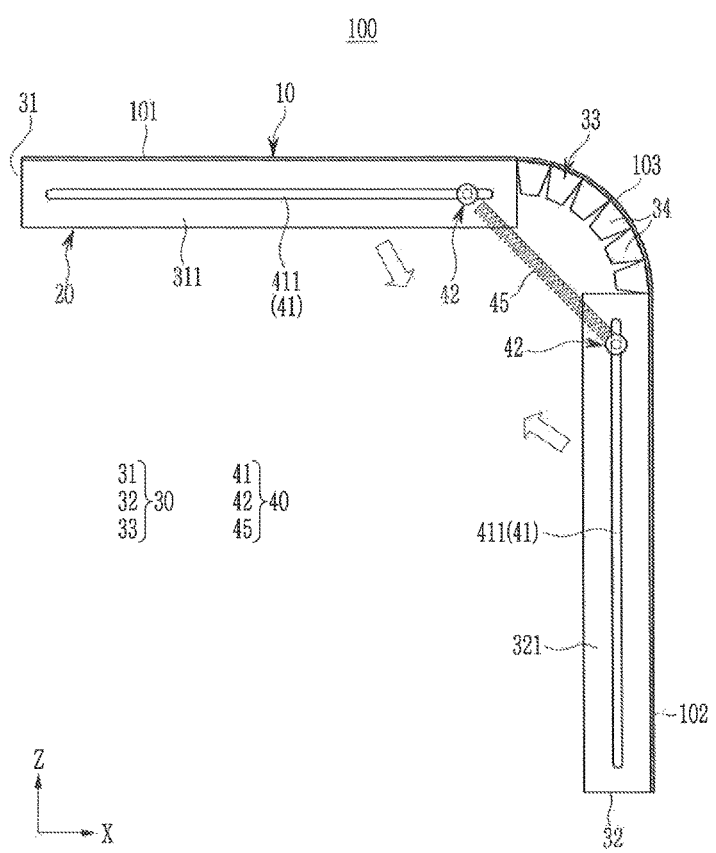
FIG. 7 shows a side view of a display device while being folded by an out-folding method according to an exemplary embodiment of the present invention.
Figure 8:
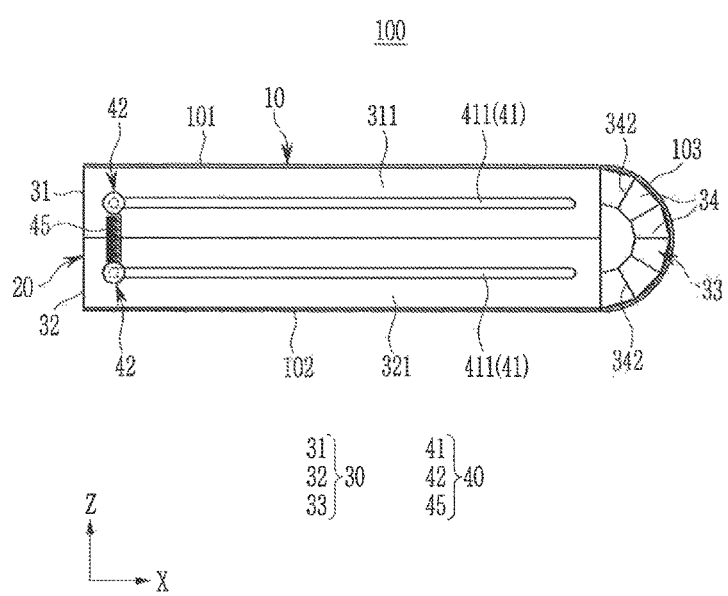
FIG. 8 shows a side view of a display device folded by an out-folding method according to an exemplary embodiment of the present invention.

FIG. 7 shows a side view of a display device while being folded by an out-folding method according to an exemplary embodiment of the present invention. FIG. 8 shows a side view of a display device folded by an out-folding method according to an exemplary embodiment of the present invention.

Referring to FIG. 6 to FIG. 8, the elastic body 45, when extended to a maximum extent in the unfolded state of the display device 100, has the elastic restoration force to contract. During the unfolded state, when the user applies a force to the display device 100 to fold the display device 100, the force applied by the user and the elastic restoration force of the elastic body 45 are applied to the display panel 10 and the display panel 10 is quickly folded.

For example, when the user applies a force to the display device 100 to fold the display device 100, the form varying support unit 33 and the bendable region 103 start to be bent. At this time, a pair of rolling members 42 slide away from the form varying support unit 33, and the elastic body 45 contracts to pull the first support plate 31 and the second support plate 32 toward each other.

When the elastic body 45 contracts from the extending state, the rotation pin 44 rotates in the slider 43, and respective end portions of the elastic body 45 may rotate. With reference to FIG. 7 and FIG. 8, the rotation pin 44 combined with the first support plate 31 rotates by about 90 degrees in a clockwise direction, and the rotation pin 44 combined with the second support plate 32 rotates by about 90 degrees in a counterclockwise direction.

When the display device 100 is in the folded state, slanted sides 342 of the form varying support unit 33 touch each other, and the first support plate 31 overlaps the second support plate 32. Further, while in the folded state, the pair of rolling members 42 are provided the most distant from the form varying support unit 33, and the elastic body 45 is provided in parallel to the third direction (e.g., the Z direction) crossing the first direction (e.g., the X direction) and the second direction (e.g., the Y direction).

As the elastic body 45 pulls the first support plate 31 and the second support plate 32 with the elastic restoration force, the display panel 10 can be easily switched to the folded state from the unfolded state. Therefore, the user may easily fold the display device 100 without applying a strong force to the display device 100. In other words, the force needed by a user to fold the display device 100 may be reduced because of the strength of the elastic restoration force of the elastic body 45.

In an exemplary embodiment of the present invention, the one pair of guide lines 41 may extend in the first direction (e.g., the X direction) and may have a slight curvature or a plurality of slight curvatures. The slight curvature of the pair of guide lines 41 may also reduce the force needed by a user to fold the display device 100 and may prevent the display device 100 from folding too quickly.

Figure 9:
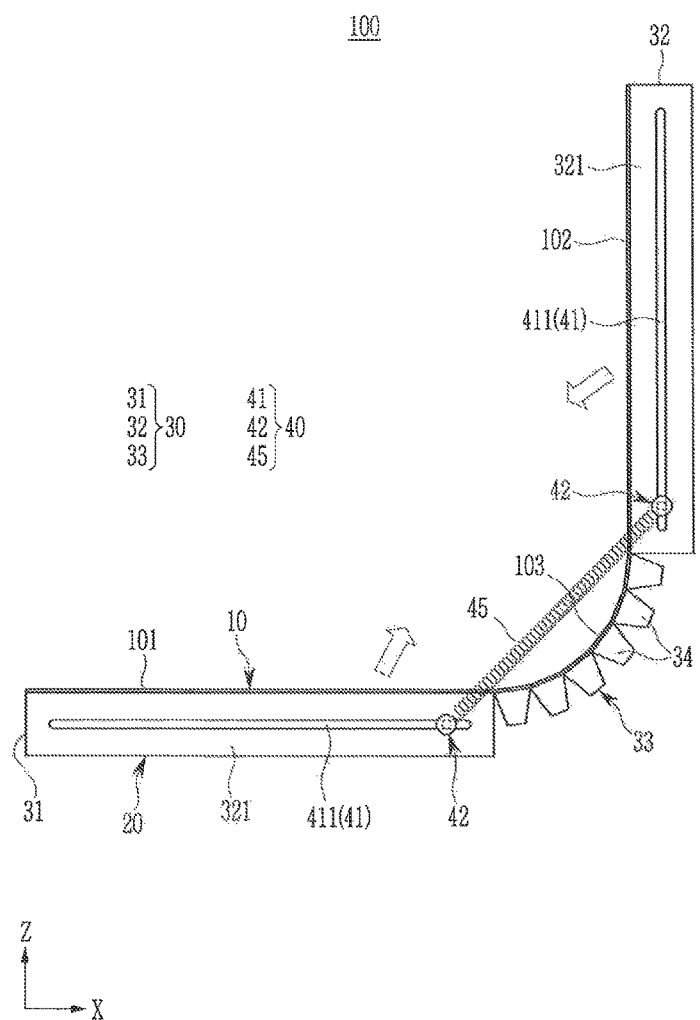
FIG. 9 shows a side view of a display device while being folded by an in-folding method according to an exemplary embodiment of the present invention.
Figure 10:
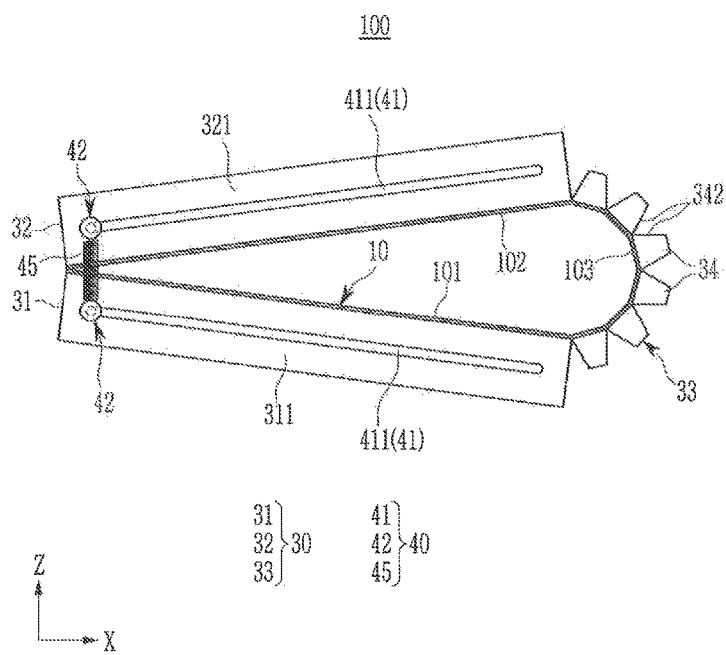
FIG. 10 shows a sideview of a display device folded by an in-folding method according to an exemplary embodiment of the present invention.

FIG. 9 shows a side view of a display device while being folded by an in-folding method according to an exemplary embodiment of the present invention. FIG. 10 shows a side view of a display device folded by an in-folding method according to an exemplary embodiment of the present invention.

Referring to FIG. 6, FIG. 9, and FIG. 10, according to the in-folding method, the form varying support unit 33 is bent to form a semi-circle shape with the bendable region 103 within the semi-circle shape. In this configuration, the neighboring slanted sides 342 spread as far apart from each other as possible.

When the display device 100 is folded, a pair of rolling members 42 slide to be distant from the form varying support unit 33, and the elastic body 45 contracts to pull the first support plate 31 and the second support plate 32 toward each other. During this process, the rotation pin 44 rotates in the slider 43 and the respective end portions of the elastic body 45 rotate.

With reference to FIG. 9 and FIG. 10, the rotation pin 44 combined with the first support plate 31 may rotate by about 90 degrees or more in the counterclockwise direction, and the rotation pin 44 combined with the second support plate 32 may rotate by about 90 degrees or more in the clockwise direction. When the display device 100 is in the folded state, an end portion of the first support plate 31 that is most distant from the form varying support unit 33 and an end portion of the second support plate 32 that is most distant from the form varying support unit 33 may contact each other.

When the display device 100 is folded by the out-folding method or the in-folding method as described above, the display panel 10 may be easily switched to the folded state by the elastic restoration force of the elastic body 45.

It is to be understood that the second end portion P2 of the guide line 41 may be provided closer to the form varying support unit 33 than that shown in FIG. 1.

Figure 11:
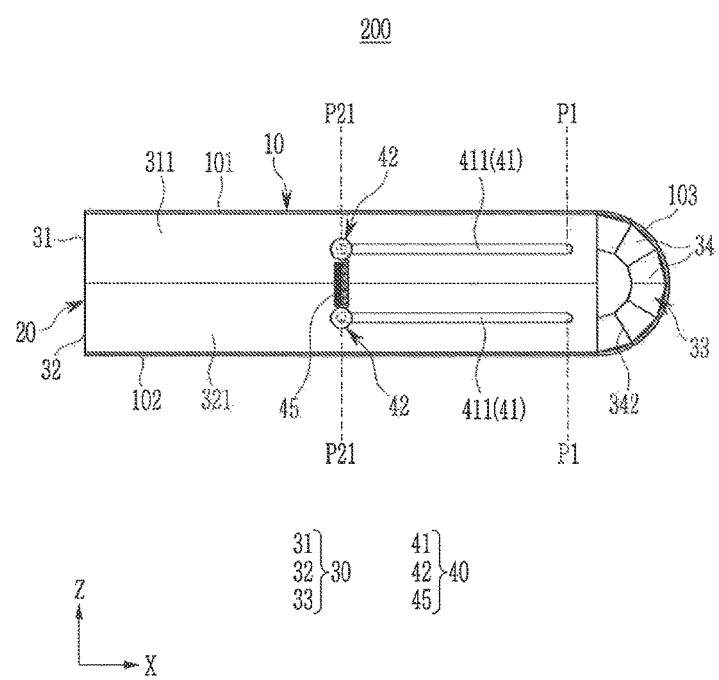
FIG. 11 and FIG. 12 show a side view of a folded state of a display device according to an exemplary embodiment of the present invention.
Figure 12:
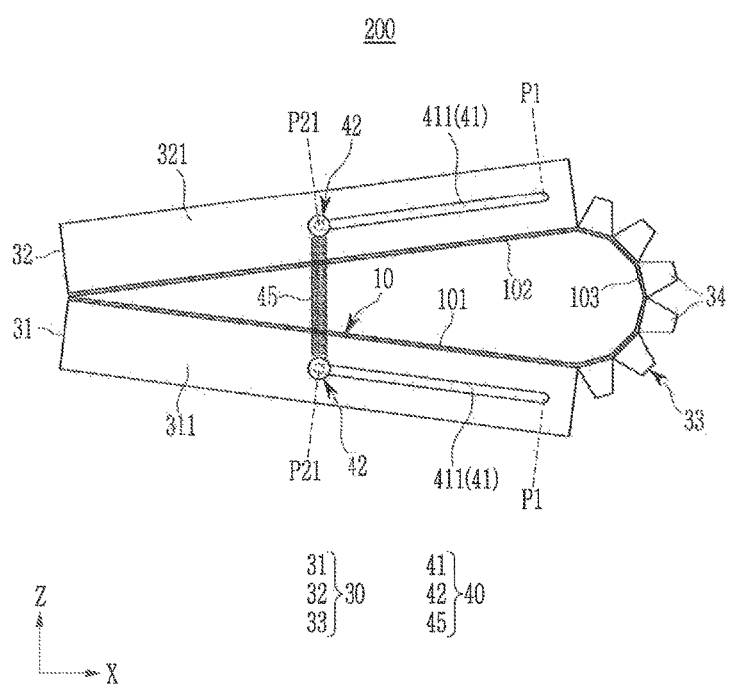

FIG. 11 and FIG. 12 show a side view of a folded state of a display device according to an exemplary embodiment of the present invention.

Referring to FIG. 11 and FIG. 12, regarding the display device 200 according to an exemplary embodiment of the present invention, respective lengths of a pair of guide lines 41 may be substantially half the length of the respective lateral sides of the first support plate 31 and the second support plate 32. A position of the first end portion P1 of the guide line 41 corresponds to that shown in FIG. 1, and a position of the second end portion P21 is provided nearer the form varying support unit 33 than that shown in FIG. 1.

When the display device 200 of FIGS. 11 and 12 is switched to the folded state from the unfolded state, the first support plate 31 and the second support plate 32 may touch each other, and thus, the folding operation may be finished before the respective end portions of the elastic body 45 reach the second end portion P2 of the guide line 41 shown in FIG. 1.

Regarding the display device 200 shown, for example, in FIGS. 11 and 12, when the folding operation is finished, the second end portion P21 of the guide line 41 may correspond to the position of the end portion of the elastic body 45 or may be provided a little further from the form varying support unit 33.

While the present invention has been particularly shown and described with reference to exemplary embodiments thereof, it will be apparent to those of ordinary skill in the art that various changes in form and detail may be made thereto without departing from the spirit and scope of the present invention as defined by the following claims.

What is claimed is:

1. A display device, comprising:
a display panel including a first region, a bendable region, and a second region arranged in sequence;
a panel support unit including a first support plate for supporting the first region, a form varying support unit for supporting the bendable region, and a second support plate for supporting the second region; and
an elastic support unit including a first guide line provided on a lateral side of the first support plate, a second guide line provided on a lateral side of the second support plate, a first rolling member rotatably coupled to the first guide line, a second rolling member rotabably coupled to the second guide line, and an elastic body including a first end portion fixed to the first rolling member and a second end portion fixed to the second rolling member.

2. The display device of claim 1, wherein
the first and second guide lines include a concave groove including an inlet portion and an internal portion that is wider than the inlet portion.

3. The display device of claim 2, wherein
the first and second rolling members respectively include
a slider disposed in the internal portion of the first and second guide lines, respectively, and
a rotation pin including a first end rotatably coupled to the slider and a second end protruding outside the first and second guide lines, respectively.

4. The display device of claim 3, wherein
the first end portion of the elastic body is fixed to the rotation pin of the first rolling member, and
the second end portion of the elastic body is fixed to the rotation pin of the second rolling member.

5. The display device of claim 1, wherein
the form varying support unit includes a multi-joint member configured to unfold and fold, and
the panel support unit has one of an unfolded state and a folded state according to a form of the form varying support unit.

6. The display device of claim 5, wherein each of
the first and second guide lines include a first end portion that is near the form varying support unit and a second end portion that is far from the form varying support unit, and
in the unfolded state, the first and second rolling members are provided on the first end portion of the first and second guide lines, respectively.

7. The display device of claim 6, wherein
when switching to the folded state from the unfolded state, the first and second rolling members slide and rotate toward the second end portion, of the first and second guide lines, respectively, and the elastic body contracts and pulls the first support plate and the second support plate toward each other.

8. The display device of claim 5, wherein the panel support unit is folded by an out-folding method in which the display panel is provided outside of the panel support unit, or an in-folding method in which the display panel is provided inside the panel support unit.

9. The display device of claim 1, wherein the first guide line and the second guide line are on a same side of the display device.

10. A display device, comprising:
a display panel including a first region, a bendable region, and a second region consecutively arranged in a first direction;
a panel support unit including a first support plate corresponding to the first region, a form varying support unit corresponding to the bendable region, and a second support plate corresponding to the second region, wherein the panel support unit is configured to switch between an unfolded state and a folded state by a movement of the bendable region and the form varying support unit; and
an elastic body including a first end portion connected with a first rolling member configured to slide and rotate in the first direction on a lateral side of the first support plate and a second end portion connected with a second rolling member configured to slide and rotate in the first direction on a lateral side of the second support plate, wherein the elastic body is connected to the first support plate and the second support plate,
wherein the elastic body extends to a first length in the unfolded state, and when switching to the folded state from the unfolded state, the first support plate and the second support plate are pulled toward each other by contraction of the elastic body.

11. The display device of claim 10, wherein the first and second end portions of the elastic body are provided near the form varying support unit in the unfolded state, and when switching to the folded state from the unfolded state, the first and second end portions of the elastic body increase in distance from the form varying support unit.

12. The display device of claim 11, further comprising:
a first guide line provided in the first direction on the lateral side of the first support plate and a second guide line provided in the first direction on the lateral side of the second support plate,
wherein a portion of the first rolling member is disposed between the first guide line and the first end portion of the elastic body and a portion of the second rolling member is disposed between the second guide line and the second end portion of the elastic body.

13. The display device of claim 12, wherein the first and second guide lines include a concave groove including an inlet portion and an internal portion that is wider than the inlet portion.

14. The display device of claim 13, wherein the first and second rolling member respectively include a slider disposed in the internal portion, and a rotation pin, wherein the rotation pin includes a first end rotatably coupled to the slider and a second end protruding outside of the first and second guide lines respectively, and
the first and second end portion of the elastic body are fixed to the rotation pin of the first and second rolling members, respectively.

15. The display device of claim 10, wherein the form varying support unit includes a multi-joint member configured to unfold and fold, and
the panel support unit is folded by an out-folding method in which the display panel is provided outside of the panel support unit, or an in-folding method in which the display panel is provided inside the panel support unit.

16. A display device, comprising:
a flexible display panel including a first region, a second region and a flexible region disposed between the first region and the second region;
a panel support structure including a first support plate overlapping the first region, a form varying support unit overlapping the flexible region and including a plurality of joints, and a second support plate overlapping the second region;
an elastic support unit including a first guide line, a second guide line, a first rolling member and a second rolling member respectively disposed in the first guide line and in the second guide line, and an elastic body connected to the first and second rolling members, wherein the first guide line is provided in a lateral side of the first support plate and the second guide line is provided in a lateral side of the second support plate, and the first and second rolling members respectively travel inside of the first and second guide lines.

17. The display device of claim 16, wherein a first end portion of the elastic body is connected to the first rolling member and a second end portion of the elastic body is connected to the second rolling member.

18. The display device of claim 17, wherein when the flexible display panel is in an unfolded position, the first and second rolling members are near the form varying support unit.

19. The display device of claim 16, wherein the first guide line is an opening in the first support plate and the second guide line is an opening in the second support plate.

20. The display device of claim 16, wherein at least one joint of the plurality of joints has a bar shape and a trapezoidal shape in a cross-sectional view, and
the form varying support unit further includes rotation shafts provided between the plurality of joints.

* * * * *